(12) United States Patent
Lin et al.

(10) Patent No.: US 8,047,365 B1
(45) Date of Patent: Nov. 1, 2011

(54) FOLDABLE CASE FOR STORING MULTIMEDIA DEVICE

(75) Inventors: Pi-Fen Lin, Taipei (TW); Man-Chun Wei, Taipei (TW); Hsiao-Hsuan Wei, Taipei (TW)

(73) Assignee: Pi-Fen Lin, Taipei (TW)

( * ) Notice: Subject to any disclaimer, the term of this patent is extended or adjusted under 35 U.S.C. 154(b) by 0 days.

(21) Appl. No.: 13/092,952

(22) Filed: Apr. 24, 2011

(51) Int. Cl.
*B65D 85/00* (2006.01)
(52) U.S. Cl. ......... 206/320; 206/702; 206/472; 206/818
(58) Field of Classification Search .................. 206/576, 206/320, 701, 702, 472, 473, 818
See application file for complete search history.

(56) References Cited

U.S. PATENT DOCUMENTS

| | | | | |
|---|---|---|---|---|
| 3,593,845 | A * | 7/1971 | Schwartz | 206/387.1 |
| 6,229,779 | B1 * | 5/2001 | Berry et al. | 720/655 |
| 6,305,547 | B1 * | 10/2001 | Curran | 206/542 |
| 2008/0164174 | A1 * | 7/2008 | Chan et al. | 206/474 |
| 2010/0224533 | A1 * | 9/2010 | Sirichai et al. | 206/736 |

* cited by examiner

*Primary Examiner* — Jacob K Ackun
(74) *Attorney, Agent, or Firm* — Li & Cai Intellectual Property (USA) Office

(57) ABSTRACT

A foldable case for storing a multimedia device including a first protective sheet, a second protective sheet and a connecting unit is disclosed. The second protective sheet is used for securing the multimedia device. The connecting unit disposed between the first protective sheet and the second protective sheet may serve as a hinge with respect to which the first protective sheet is foldable over the second protective sheet. The connecting unit has an earphone receiving cavity, and a magnetic element is located in the earphone receiving cavity for magnetically attracting a wireless earphone. Moreover, as the wireless earphone is in the proximity of the earphone receiving cavity, the magnetic element magnetically attracts the wireless earphone so that the wireless earphone may be accommodated within the earphone receiving cavity.

12 Claims, 5 Drawing Sheets

FOLDABLE CASE FOR STORING MULTIMEDIA DEVICE

BACKGROUND OF THE INVENTION

1. Field of the Invention

The present invention relates to a foldable case for a multimedia device; in particular, it relates to a foldable case applicable to storage of the multimedia device and wireless earphone.

2. Description of Related Art

At present, multimedia devices, such as tablet personal computers (PC) or smart-phones, have been a part of people's daily lives. As such, the multimedia devices are subject to accidental damages including collisions with other objects, requiring protection provided by dedicated foldable cases.

Whereas the aforementioned dedicated foldable cases may shield the multimedia devices they encase from accidental damages, other accessories thereof, e.g., wireless earphone, may not enjoy the similar protection as they are not to be held by the dedicated foldable cases. Besides, since the wireless earphone and the multimedia device are separately placed inconvenience may result especially when both the accessories and the multimedia devices are sought at the same time.

SUMMARY OF THE INVENTION

With regards to the above-said issues, a foldable case for the multimedia device according to an embodiment of the present invention allows for encasing of the multimedia device and the wireless earphone associated with the multimedia device is provided.

According to an embodiment of the present invention, a foldable case for the multimedia device includes a first protective sheet, a second protective sheet and a connecting unit. The second protective sheet is used to secure the multimedia device at a predetermined position, and the connecting unit between the first protective sheet and the second protective sheet may serve as a hinge. The first protective sheet may be foldable with respect to the hinge over the second protective sheet. The connecting unit has an earphone receiving cavity, and a magnetic element is placed in the earphone receiving cavity for magnetically attracting a wireless earphone. In this way, as the wireless earphone is in the proximity of the earphone receiving cavity, the magnetic element magnetically attracts the wireless earphone so that the wireless earphone is accommodated within the earphone receiving cavity in a secured fashion.

According to another embodiment of the present invention, a foldable case for the multimedia device includes a first protective sheet, a second protective sheet and a connecting unit. The second protective sheet further includes an electric connecting port for providing an electrical connection with the multimedia device encased by the first protective sheet and the second protective sheet. The first protective sheet may be foldable with respect to the connecting unit over the second protective sheet. Meanwhile, the connecting unit has an earphone receiving cavity having a magnetic element, and an electric connecting point. The electric connecting point is coupled to the electric connecting port in the second protective sheet, and the magnetic element is used to magnetically attract a wireless earphone. Under this arrangement, as the wireless earphone is in the proximity of the earphone receiving cavity, the magnetic element magnetically attracts the wireless earphone for accommodation and placement of the wireless earphone within the earphone receiving cavity when the wireless earphone may be in the electrical connection with the electric connecting point.

In summary of the aforementioned descriptions, the foldable case for the multimedia device according to the embodiment of the present invention is adapted to encase the multimedia device and the wireless earphone associated with the multimedia device together, so as to minimize the inconvenience which may occur when the wireless earphone and the multimedia device are forced to be separately placed. At the same time, the foldable case for storing multimedia device according to the embodiment of the present invention also enables the electrical connection between the multimedia device and the wireless earphone even when both of the multimedia device and the wireless phone have been received within the foldable case.

In order to further appreciate the characteristics and technical contents of the present invention, references are made to the details descriptions of the present invention as well as appended drawings therein; but, however, all such inventive details descriptions and appended drawings are merely illustrative rather than being intended to limit the claimed scope thereof in any aspect.

DETAILED DESCRIPTION OF THE PREFERRED EMBODIMENTS

Figure 1:
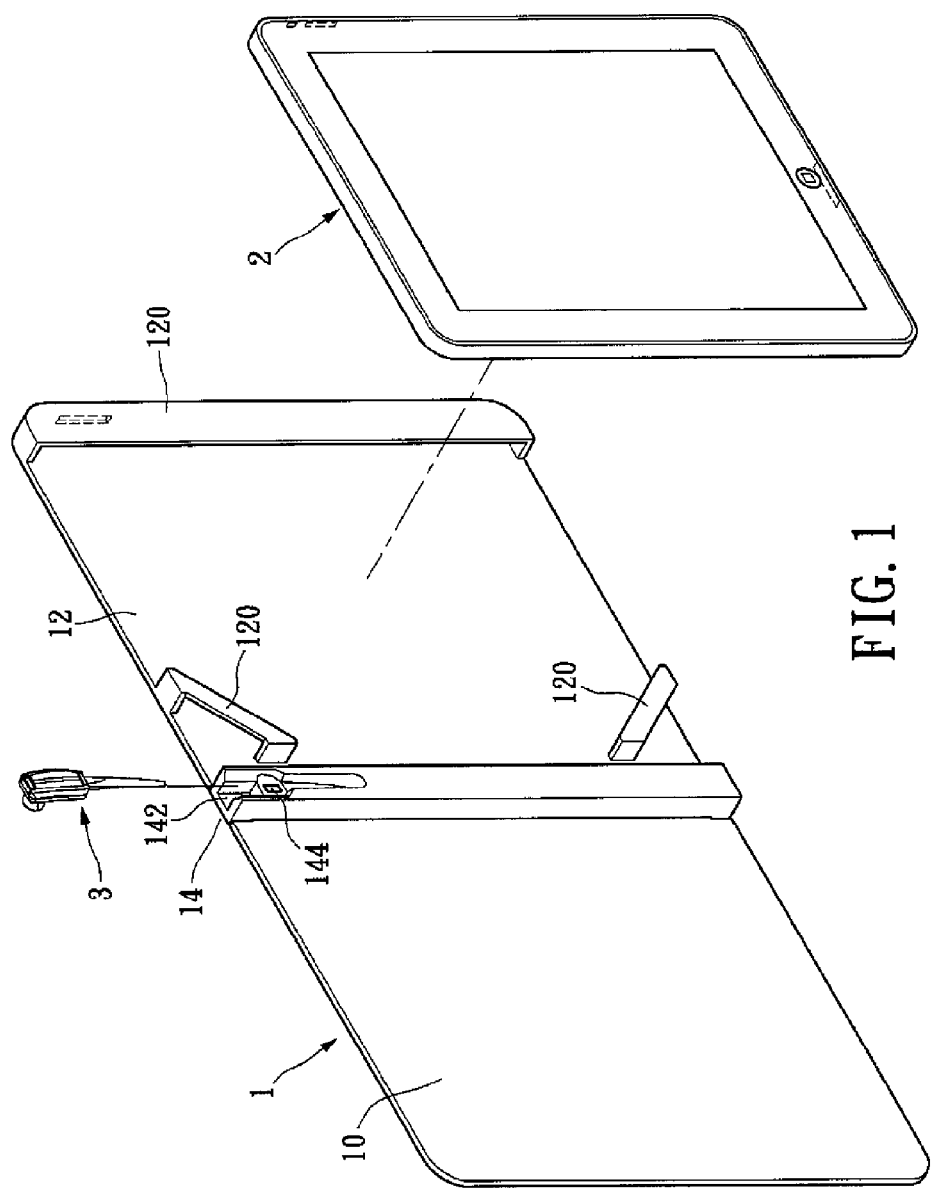
FIG. 1 shows a structural diagram of a foldable case for storing a multimedia device according to an embodiment of the present invention.

Please to FIG. 1 in which a structural diagram of a foldable case for storing a multimedia device according to an embodiment of the present invention is shown. The foldable case 1 may be in fit with a multimedia device 2 like a Personal Digital Assistant (PDA), a tablet PC, a smart-phone and so forth, and provides protections for the surface of the multimedia device 2 as well. Meanwhile, the foldable case 1 may be adapted to further accommodate a wireless earphone 3 associated with the multimedia device 2 thereby achieving the purpose of protection for the wireless earphone 3.

As shown in FIG. 1, the foldable case 1 includes a first protective sheet 10, a second protective sheet 12, and a connecting unit 14. The second protective sheet 12 has a hold structure 120 for helping secure the multimedia device 2 at a predetermined position of the second protective sheet 12. In addition, the connecting unit 14 is disposed between the first protective sheet 10 and the second protective sheet 12. Therefore, the connecting unit 14 may serve as a hinge so that the first protective sheet 10 may be foldable over the second protective sheet 12 and the multimedia device 2 to ensure that the multimedia device 2 could be properly protected when the multimedia device 2 is placed between the first protective sheet 10 and the second protective sheet 12. In one implementation, the foldable case 1 is a foldable wrap capable of encasing the multimedia device 2.

Refer again to FIG. 1. The connecting unit 14 includes an earphone receiving cavity 142, and a magnetic element 144 inside the earphone receiving cavity 142 for magnetically attracting the wireless earphone 3. More specifically, the earphone receiving cavity 142 may be an open slot for the secured placement of the wireless earphone 3; under this arrangement, the wireless earphone 3 may be separately placed within the earphone receiving cavity 142 with respect to the multimedia device 2.

Moreover, as the wireless earphone 3 approaches the earphone receiving cavity 142, the magnetic element 144 inside the earphone receiving cavity 142 magnetically attracts the wireless earphone 3 such that the wireless earphone 3 may be received within the earphone receiving cavity 142 in a secured fashion.

The magnetic element 144 may be attached to the interior of the earphone receiving cavity 142 through gluing. However, said installation method does not limit the present invention, and all commercially viable approaches for affixing the magnetic element 144 to the earphone receiving cavity 142 may be covered by the present invention. In one implementation, the magnetic element 144 may be a magnet, and such a magnet can be integrally sintered by using the magnetic powder through a powder metallurgy (PM) process. Whereas the above-said materials do not limit the magnetic element 144 with all materials demonstrating the magnetic attraction feature may be applied to embody the magnetic element 144.

In summary, the foldable case 1 according to the embodiment of the present invention allows for the multimedia device 2 along with the corresponding wireless earphone 3 to be encased together so that an integral package of the multimedia device 2 and the wireless earphone 3 within the foldable case 1 may be prepared.

Figure 2:
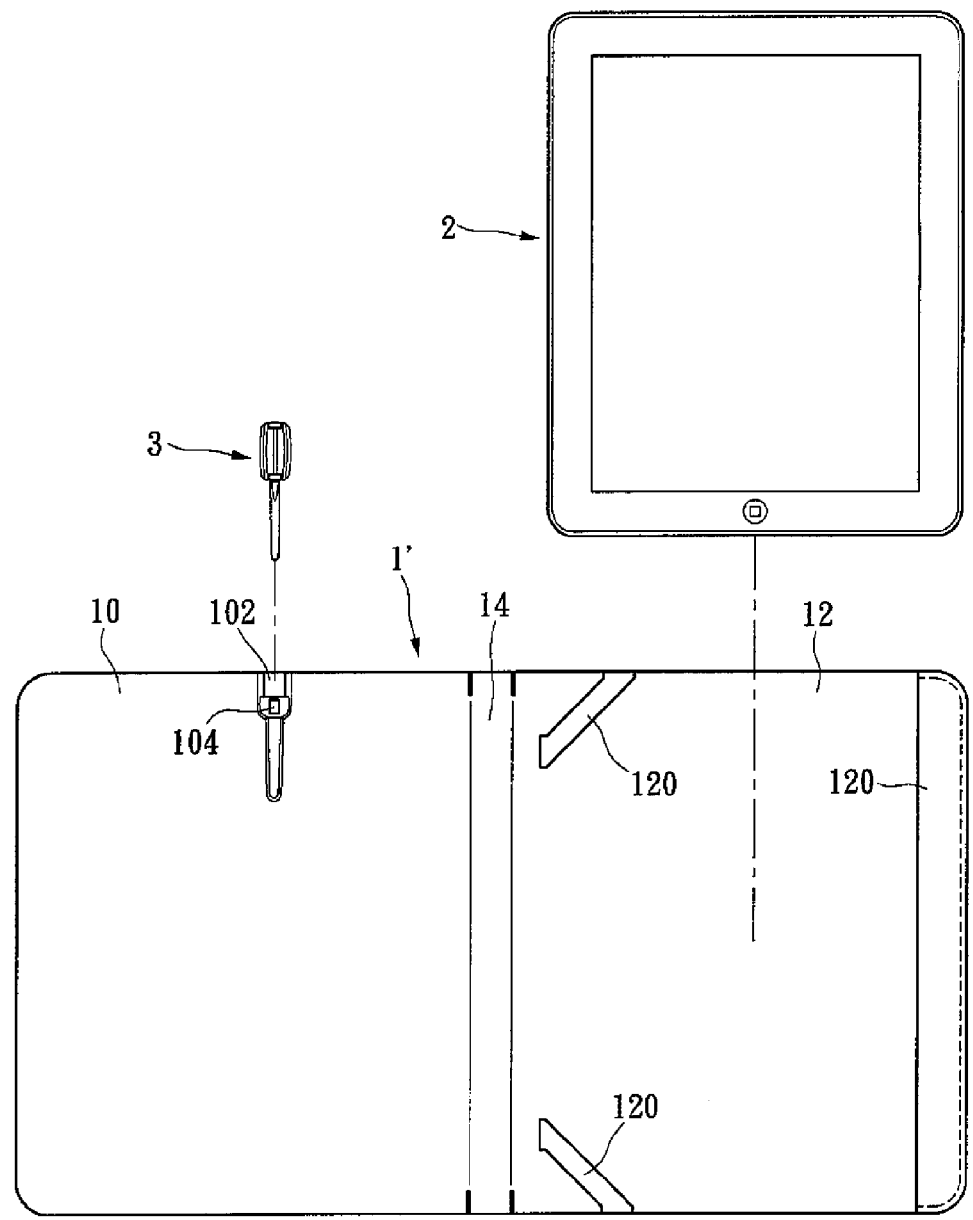
FIG. 2 shows a structural diagram of a foldable case for storing the multimedia device according to another embodiment of the present invention.

Refer next to FIG. 2 conjunctively with FIG. 1. FIG. 2 shows a structural diagram of a foldable case for storing the multimedia device according to another embodiment of the present invention. Compared with the foldable case 1 illustrated in FIG. 1, the foldable case 1' includes an earphone receiving cavity 102 on the first protective sheet 10, and a magnetic element 104 disposed inside the earphone receiving cavity 102 for magnetically attracting the wireless earphone 3. Similarly, the earphone receiving cavity 102 may be an open slot for receiving the wireless earphone 3 in the secured manner therein; thus, the wireless earphone 3 may be separately placed within the earphone receiving cavity 142 with respect to the multimedia device 2.

Figure 3:
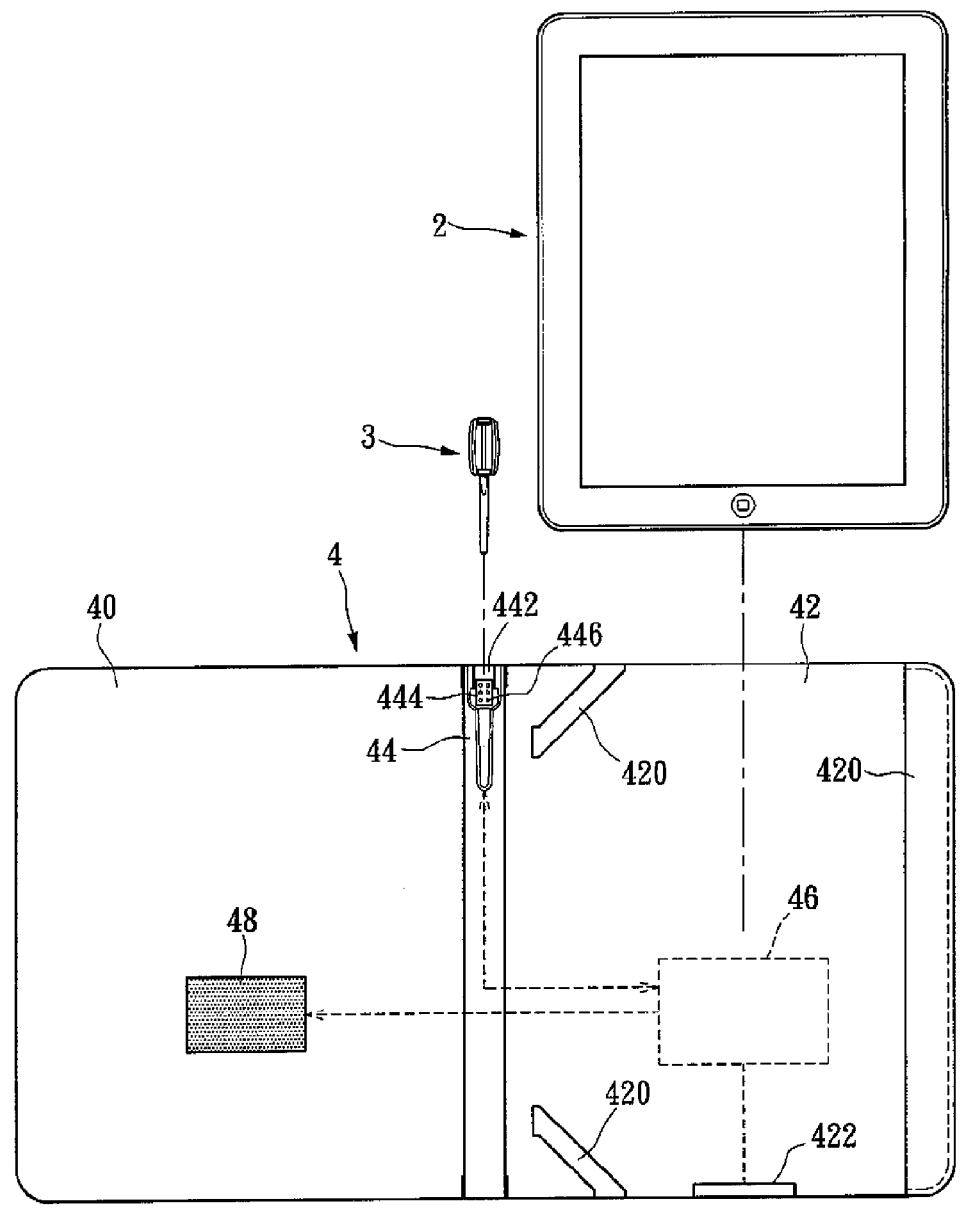
FIG. 3 shows a structural diagram of a foldable case for storing the multimedia device according to yet another embodiment of the present invention.

Moreover, as the wireless earphone 3 approaches the earphone receiving cavity 102, the magnetic element 104 inside the earphone receiving cavity 102 magnetically attracts the wireless earphone 3 such that the wireless earphone 3 may be readily received in the earphone receiving cavity 102. Refer now to FIG. 3, wherein a structural diagram of a foldable case for storing multimedia device according to yet another embodiment of the present invention is shown. A foldable case 4 includes a first protective sheet 40, a second protective sheet 42 and a connecting unit 44. The second protective sheet 42 has a hold structure 420 for securing the multimedia device 2 at another predetermined position of the second protective sheet 42. Furthermore, an electric connecting port 422 may be prepared on the second protective sheet 42. The electric connecting port 422 may be in an electrical connection with the multimedia device 2. In addition, the connecting unit 44 may serve as a hinge so that both the first protective sheet 40 and the second protective sheet 42 may be foldable with respect to the connecting unit. In one implementation, the foldable case 4 is a foldable wrap for encasing the multimedia device 2.

Refer again to FIG. 3. The connecting unit 44 includes an earphone receiving cavity 442 having an electric connecting point 446 therein, and a magnetic element 444. The magnetic element 444 may magnetically attract the wireless earphone 3, while the electric connecting point 446 is coupled to the electric connecting port 422 on the second protective sheet 42 and the wireless earphone 3 accommodated inside the earphone receiving cavity 442. In one implementation, the earphone receiving cavity 442 may be an open slot for securely receiving the wireless earphone 3 therein.

Refer again to FIG. 3. The second protective sheet 42 further includes a printed circuit 46 electrically connected to the electric connecting point 446 in the earphone receiving cavity 442 and the electric connecting port 422 on the second protective sheet 42 for providing electrical connection between the electric connecting point 446 and electric connecting port 422. The aforementioned printed circuit 46 may be a rigid printed circuit board (PCB), a flexible rigid PCB or a built-up PCB.

Figure 4:
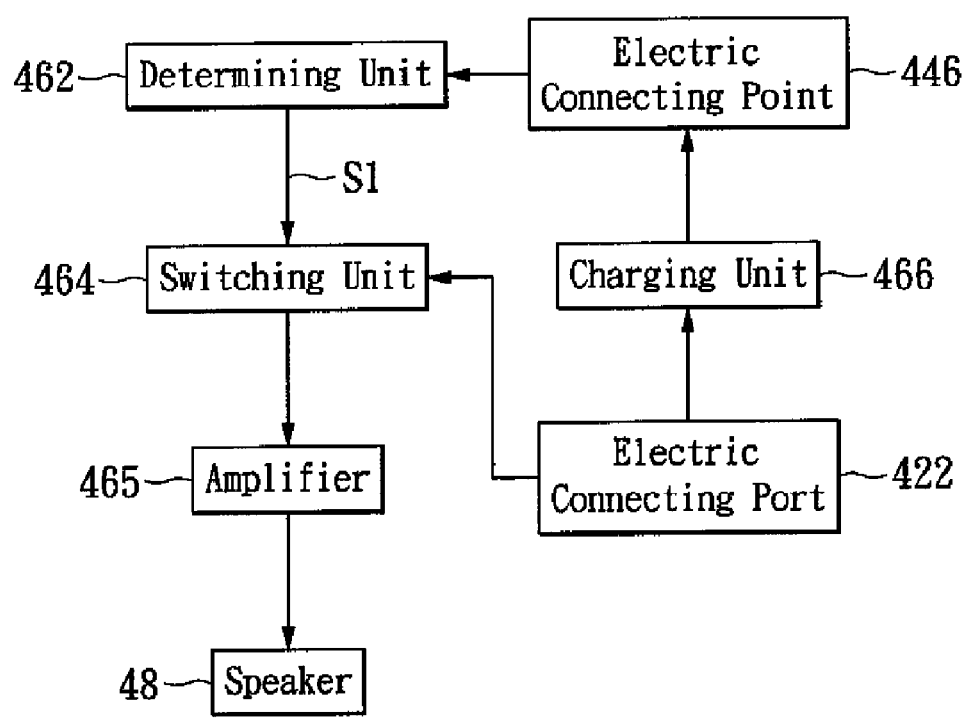
FIG. 4 shows a circuit block diagram for an embodiment of the present invention.

Refer to FIG. 4 in conjunction with FIG. 3. FIG. 4 shows a circuit block diagram for an embodiment of the present invention. The printed circuit 46 also includes a charging unit 466 electrically connected the electric connecting point 446 and the electric connecting port 422. The charging unit 466 may charge the wireless earphone 3 connected to the electric connecting point 446 in accordance with a power supply from the electric connecting port 422. Additionally, when the multimedia device 2 is placed on the second protective sheet 42 and electrically connected to the electric connecting port 422, the charging unit 466 may obtain required power supply from the multimedia device 2 via the electric connecting port 422. Thus, the charging unit 466 may charge the wireless earphone 3 through the electric connecting point 446 based on the power supply from the multimedia device 2. It is worth noting that the multimedia device 2 may obtain the required electric power via an adapter.

Refer yet again to FIGS. 3 and 4. A speaker 48 may be installed on the first protective sheet 40 of the foldable case 4. The speaker 48 is electrically connected to the printed circuit 46 of the second protective sheet 42. Accordingly, when the multimedia device 2 is disposed on the second protective sheet 42 and electrically connected to the electric connecting port 422, the multimedia device 2 may send an incoming call or music message to the speaker 48 through the electric connecting port 422 and the printed circuit 46 for amplified playbacks.

Refer yet again to FIGS. 3 and 4. The printed circuit 46 further includes a determining unit 462 and a switching unit 464. The determining unit 462 is electrically connected to the electric connecting point 446 in the earphone receiving cavity 442 while the switching unit 464 is electrically connected to the determining unit 462 and the speaker 48. When the wireless earphone 3 is received inside the earphone receiving cavity 442, the determining unit 462 outputs a driving signal Si to the switching unit 464 to cause the switching unit 464 to be a conductive path between the speaker 48 and the electric connecting port 422.

Besides, when the wireless earphone 3 is disposed within the earphone receiving cavity 442, the multimedia device 2 connected to the earphone receiving cavity 442 may perform the amplified playbacks for incoming calls or music messages through the speaker 48. On the other hand, suppose the wireless earphone 3 is not currently accommodated inside the earphone receiving cavity 442, the switching unit 464 may no longer serve as the conductive path between the speaker 48 and the electric connecting port 422, thus further interrupting the amplified playbacks of the incoming calls or music messages through the speaker 48 by the multimedia device 2.

In other words, if the wireless earphone 3 is not received within the earphone receiving cavity 442, the multimedia device 2 may be configured to transfer the incoming calls or music messages to the wireless earphone 3 by wireless transmission technologies. The wireless transmission technologies applied between the multimedia device 2 and the wireless earphone 3 may be Wi-Fi, Bluetooth™, Ultra-Wideband (UWB), Digital Enhanced Cordless Telecommunication (DECT) and the like, to name a few.

Also, the incoming calls or music messages transmitted from the multimedia device 2 may be further amplified through an amplifier 465, which is disposed between the switching unit 464 and the speaker 48 and is on the printed circuit 46, and then the amplifier 465 may forward the amplified incoming calls or music messages to the speaker 48.

Figure 5:
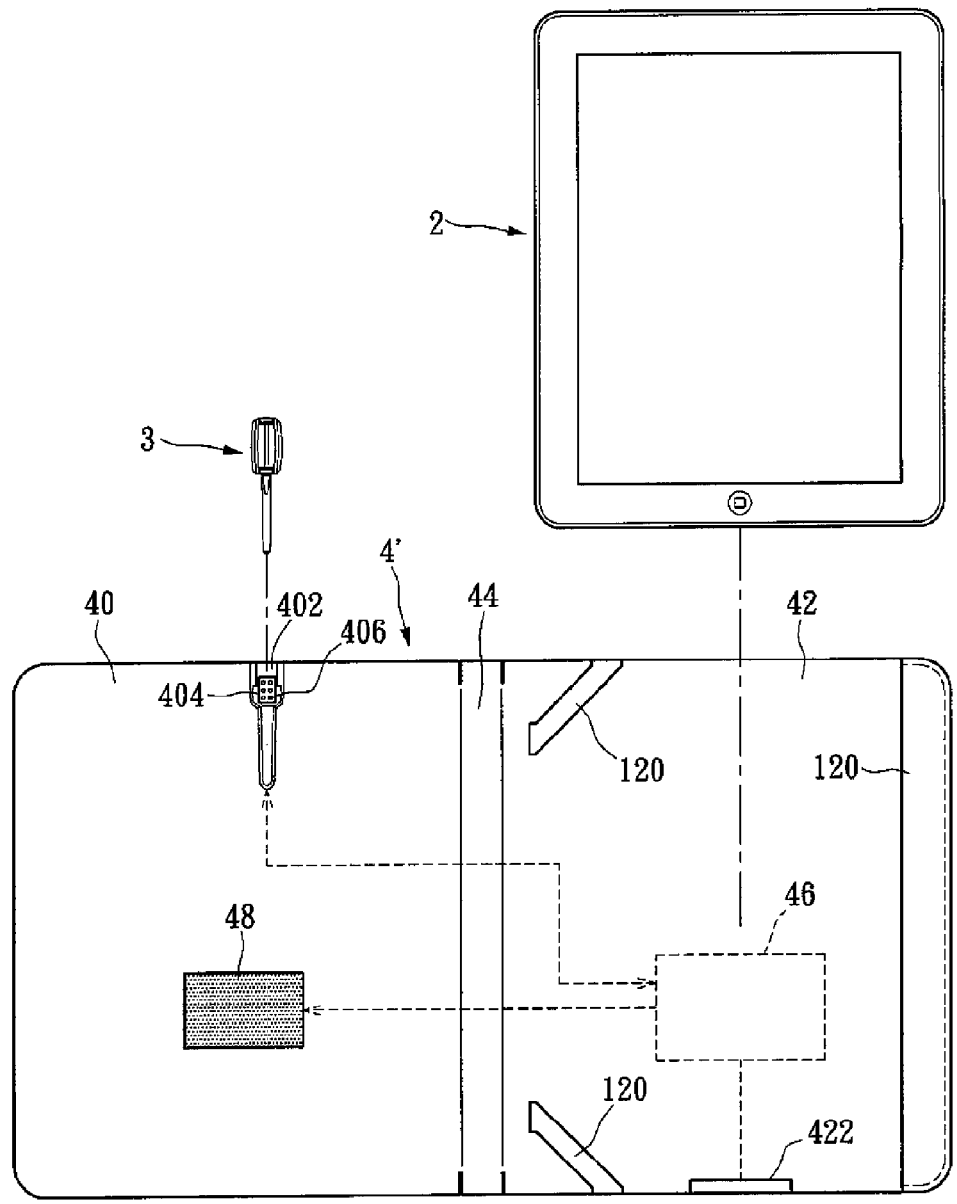
FIG. 5 shows a structural diagram of a foldable case for storing the multimedia device according to further another embodiment of the present invention.

Refer next to FIG. 5 conjunctively with FIG. 3. FIG. 5 shows a structural diagram of a foldable case for storing the multimedia device according to another embodiment of the present invention. Compared with the foldable case 4 illustrated in FIG. 3, a foldable case 4' includes an earphone receiving cavity 402 configured on the first protective sheet 40, a magnetic element 404 disposed inside the earphone receiving cavity 402 for magnetically attracting the wireless earphone 3, and an electric connecting point 406 coupled to the electric connecting port 422 of the second protective sheet 42 and electrically connected to the wireless earphone 3 accommodated in the earphone receiving cavity 402. Similarly, the earphone receiving cavity 402 may be an open slot that is capable of receiving the wireless earphone 3 in the secured manner.

In summary, the foldable cases 4 and 4' for the multimedia device according to the embodiment of the present invention may encase the multimedia device 2 and the wireless earphone 3 into an integral package, and also provide the electrical connection between the multimedia device 2 and the wireless earphone 3. As such, the wireless earphone 3 maybe charged by the multimedia device 2. In addition, the foldable cases 4 and 4' for the multimedia device according to the embodiment of the present invention further provides the electrical connection between the multimedia device 2 and the speaker 48 so as to allow the multimedia device 2 to perform amplified playbacks of the incoming calls or music messages through the speaker 48. Finally, the foldable case 4 and 4' may, based on the determination on whether the wireless earphone 3 is accommodated, correspondingly switch the output path of the incoming calls or music messages transferred by the multimedia device 2.

The aforementioned descriptions illustrate merely the embodiments of the present invention rather than limiting the claimed scope of the present invention thereto.

What is claimed is:

1. A foldable case for storing a multimedia device, comprising:
 a first protective sheet;
 a second protective sheet for carrying the multimedia device; and
 a connecting unit, connected between the first protective sheet and the second protective sheet, serving as a hinge with respect to which the first protective sheet is foldable over the second protective sheet, wherein the connecting unit has an earphone receiving cavity in which a magnetic element is placed;
 wherein, as a wireless earphone is in the proximity of the earphone receiving cavity, the magnetic element magnetically attracts the wireless earphone in order for the wireless earphone to be accommodated within the earphone receiving cavity in a secured manner.

2. The foldable case for storing the multimedia device according to claim 1, wherein the second protective sheet further comprises a hold structure for receiving the multimedia device.

3. The foldable case for storing the multimedia device according to claim 1, wherein the foldable case is a foldable wrap capable of encasing the multimedia device.

4. A foldable case for storing a multimedia device, comprising:
 a first protective sheet;
 a second protective sheet comprising an electric connecting port for an electrical connection with the multimedia device; and
 a connecting unit, connected between the first protective sheet and the second protective sheet, serving as a hinge with respect to which the first protective sheet is foldable over the second protective sheet, wherein the connecting unit has an earphone receiving cavity having an electric connecting point and a magnetic element, wherein the electric connecting point is coupled to the electric connecting port of the second protective sheet;
 wherein, when a wireless earphone is in the proximity of the earphone receiving cavity, the magnetic element magnetically attracts the wireless earphone so that the wireless earphone is accommodated within the earphone receiving cavity in a secured manner and electrically connected to the electric connecting point.

5. The foldable case for storing the multimedia device according to claim 4, wherein the second protective sheet further comprises a printed circuit embedded therein wherein the printed circuit is electrically connected between the electric connecting point and the electric connecting port.

6. The foldable case for storing the multimedia device according to claim 5, wherein the printed circuit includes a charging unit which is electrically connected between the electric connecting point and the electric connecting port and the charging unit charges the wireless earphone electrically connected to the electric connecting point based on a power supply from the electric connecting port.

7. The foldable case for storing the multimedia device according to claim 5, wherein the first protective sheet further comprises a speaker installed thereon.

8. The foldable case for storing the multimedia device according to claim 7, wherein the speaker is electrically connected to the printed circuit.

9. The foldable case for storing the multimedia device according to claim 8, wherein the printed circuit comprises a determining unit, and the determining unit outputs a driving signal when the wireless earphone is accommodated within the earphone receiving cavity.

10. The foldable case for storing the multimedia device according to claim 9, wherein the printed circuit further comprises a switching unit which is electrically connected to the determining unit and the speaker and is controlled by the driving signal for a connection between the speaker and the electric connecting port.

11. The foldable case for storing the multimedia device according to claim 10, wherein the printed circuit further comprises an amplifier electrically connected between the switching unit and the speaker.

12. The foldable case for storing the multimedia device according to claim 4, wherein the second protective sheet further comprises a hold structure for securing the multimedia device at a predetermined position of the second protective sheet.

* * * * *